United States Patent [19]

Brewer et al.

[11] 3,710,085

[45] Jan. 9, 1973

[54] PRE-SET ELECTRONIC CASH REGISTER

[75] Inventors: Donald R. Brewer; Richard A. Schipper, both of San Diego, Calif.

[73] Assignee: Tele Cash, Inc., San Diego, Calif.

[22] Filed: Oct. 26, 1970

[21] Appl. No.: 83,790

[52] U.S. Cl. .................................235/164, 235/168
[51] Int. Cl. .............................................G06f 7/52
[58] Field of Search......................235/164, 168, 176

[56] References Cited

UNITED STATES PATENTS

| | | | |
|---|---|---|---|
| 3,253,132 | 5/1966 | Pendleton | 235/168 |
| 3,267,436 | 8/1966 | Alpert et al. | 340/172.5 |
| 3,330,947 | 7/1967 | Alpert et al. | 235/176 |
| 3,598,973 | 8/1971 | Brooks | 235/168 |

*Primary Examiner*—Malcolm A. Morrison
*Assistant Examiner*—David H. Malzahn
*Attorney*—Richard K. MacNeill

[57] ABSTRACT

A pre-set electronic cash register in which a magnetic core matrix is utilized for price, inventory and cash total memory, and for temporary storage of quantity, tax and total for individual transactions. Each item for sale in a given transaction is represented by a separate item key which, together with a quantity key, has an input to the core memory. The price for each individual item is stored in the corresponding item in memory. This is addressed with an item key and a quantity key for each transaction and read out into a shift register through suitable core timing circuitry. The shift register is parallely connected to an accumulator which, when the item priced and quantity or multiplier has been shifted out of the shift register, contains the product. The tax rate is accomplished through a binary number representing the tax rate times 200 which is multiplied by the total and divided by 200 after which it is added to the sum of the product's item and quantity. An updated inventory is coupled back to the core memory system after each transaction. When the transaction is completed, printer-control circuitry activates a printer which itemizes the transaction and prints out the tax and total. Inventory keys are provided for printing out the existing inventory stored in the memory core. Suitable circuitry is provided for changing item prices and tax rates. The minimum tax rate is programmed through a BCD to binary converter into a subtractor for comparing an individual transaction with a minimal tax rate and inhibits the tax circuitry when the transaction is below the minimum taxable purchase.

6 Claims, 3 Drawing Figures

Fig. 3

PRE-SET ELECTRONIC CASH REGISTER

BRIEF DESCRIPTION OF THE INVENTION

The present invention relates to a pre-set electronic cash register and more particularly to a pre-set electronic cash register which automatically computes sales tax and carries a running inventory.

According to the invention, a pre-set electronic cash register is provided in which a plurality of items for sale, for example, milk shakes, hamburgers, onion rings, etc., each have an item key on a keyboard which is coupled to a separate row of memory bits in the memory storage system. Each item row has a plurality of bits for quantity, price and inventory, the price bits being on a semi-permanent basis and the quantity and inventory bits being changed with each transaction. A bit timer scans each of the items during each readout and the items along with the quantity are read out serially into a shift register which is parallely loaded into an accumulator, the accumulator holding the product of the individual price and quantity. The accumulator has an output coupled to a minimum taxable purchase subtractor which compares the minimum taxable purchase with the transaction and inhibits further tax computation if the transaction is beneath the statutory minimum programmed into the machine. If the transaction is above the minimum taxable purchase, the tax multiplier is applied and added to the transaction total which is printed out through a printer connected in parallel to a Nixie display unit. Each time an individual item transaction is completed, it is added to the item inventory in the core memory. Readouts are provided for daily total, inventory, etc., as well as transaction clearing and cancelling circuitry. Hence, an electronic cash register is provided which maintains a constantly updated inventory record, as well as automatically computing sales tax.

An object of the present invention is the provision of a pre-set electronic cash register which maintains a constantly updated item inventory.

Another object of the invention is the provision of a pre-set electronic cash register in which sales tax is computed automatically.

A further object of the invention is the provision of a pre-set electronic cash register in which current inventory can be conveniently read out.

Another object of the invention is the provision of a pre-set electronic cash register in which item price changes and sales tax changes can be easily programmed.

Yet another object of the invention is the provision of a pre-set electronic cash register which is inexpensive to manufacture and extremely convenient in use.

Other objects and many of the attendant advantages of this invention will be readily appreciated as the same becomes better understood by reference to the following detailed description when considered in connection with the accompanying drawings in which like reference numerals designate like parts throughout the FIGS. thereof and wherein:

FIG. 3 is a diagram illustrating the memory format of the core memory of FIG. 1.

DETAILED DESCRIPTION OF THE DRAWINGS

Figure 1:
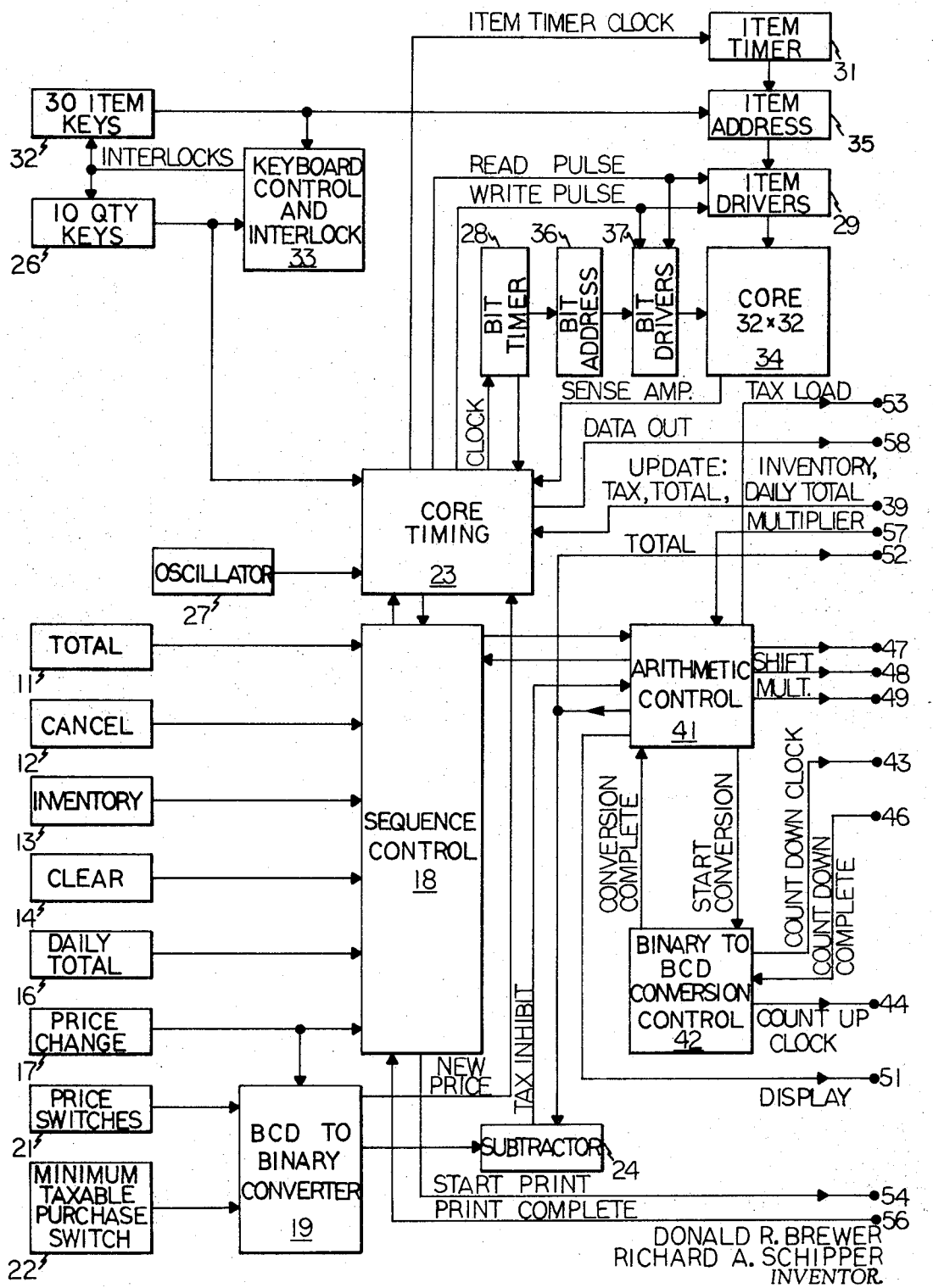
FIG. 1 is a block diagram of part of the preferred embodiment of the present invention.

Referring to FIG. 1, total key 11, cancel key 12, inventory key 13, clear key 14, daily total key 16, and price change key 17 are all coupled to sequence-control 18. Price change key 17 is also coupled to BCD to binary converter 19 which has inputs coupled to price switches 21 and minimum taxable purchase switch 22. BCD to binary converter 19 has one output coupled to core timing 23 and another output coupled to subtractor 24. Quantity keys 26, oscillator 27 and sequence-control 18 all have outputs coupled to core timing 23. Core timing 23 has an output connected to sequence-control 18 and to bit timer 28, item drivers 29, and item timer 31. Quantity keys 26 and item keys 32 are interconnected with keyboard-control and interlocks 33. Item keys 32 have an output coupled to item address 33. Item timer 31 has an output coupled to item address 33. Item address 33 has an output coupled to item drivers 29. Item drivers 29 have outputs coupled to memory core 34. Bit timer 28 has an output coupled to bit address 36 which has an output coupled to bit drivers 37 which, in turn, have outputs coupled to memory core 34. Core timing 23 has outputs coupled to bit drivers 37. Core timing 23 also has an output coupled to terminal 58 and inputs coupled from memory core 34 and terminal 39. Sequence control 18 has an output and an input coupled to arithmetic control 41. Arithmetic control 41 has an output and input coupled to binary to BCD converter 42 which has outputs coupled to terminals 43 and 44 and an input coupled to terminal 46. Arithmetic control 41 has outputs coupled to terminals 47, 48, 49, 51, 52 and 53. Terminal 52 is also coupled to subtractor 24. Sequence control 18 has an output coupled to terminal 54 and an input coupled to terminal 56.

Figure 2:
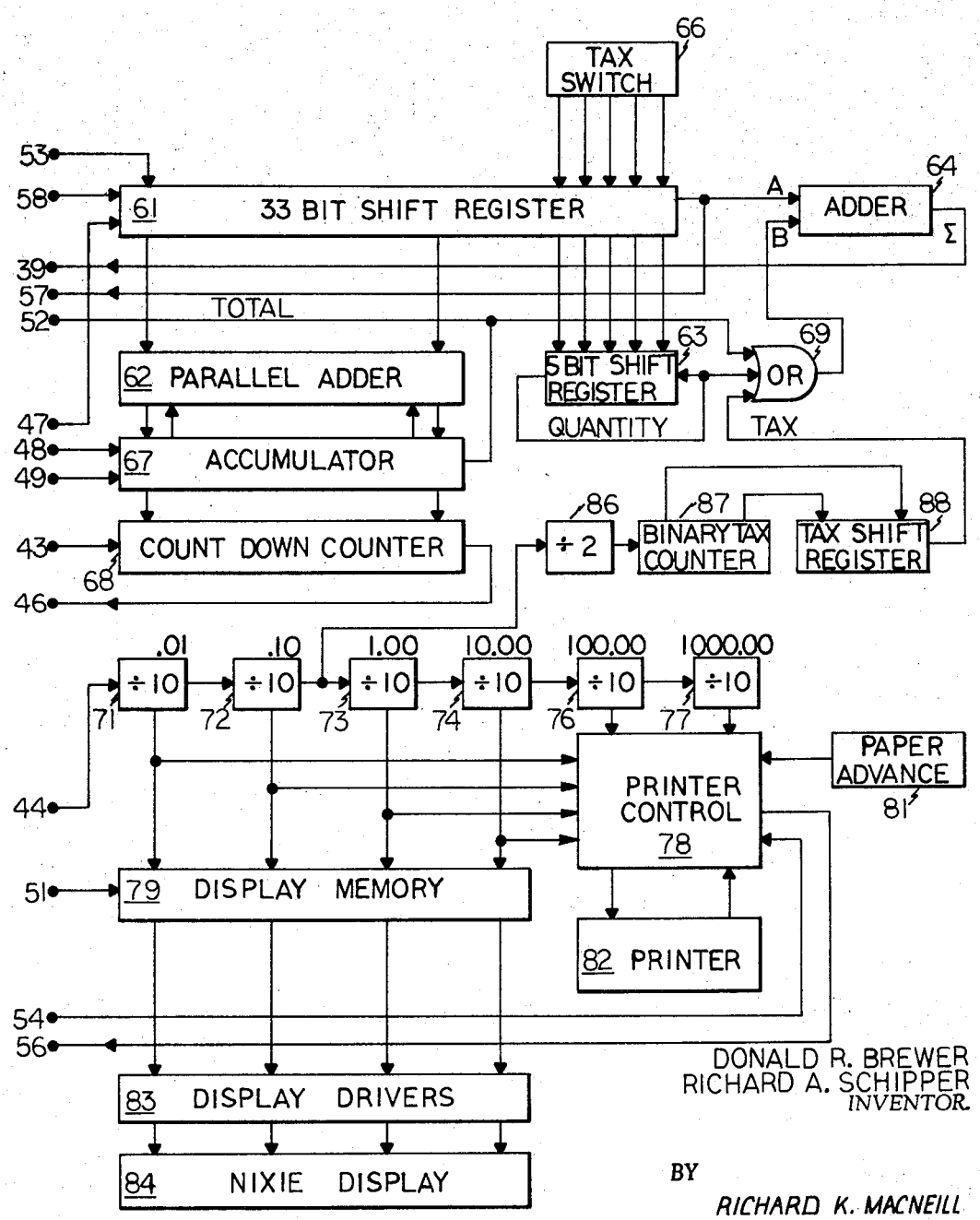
FIG. 2 is a block diagram of the remainder of the embodiment of FIG. 1.

Referring to FIG. 2, terminals 58, 53 and 47 are all coupled to 33 bit shift register 61 which has outputs coupled to parallel adder 62, five bit shift register 63, adder 64 and terminal 57. Tax switch 66 is also coupled to 33 bit shift register 61. Parallel adder 62 is coupled to accumulator 67 which, in turn, is coupled to countdown counter 68, one input of ORgate 69, and terminal 52. Terminals 48 and 49 are also coupled to accumulator 67.

Countdown counter 68 has one input coupled to terminal 43 and an output coupled to terminal 46. Terminal 44 is coupled to decade counter 71 which has an output coupled to decade counter 72 which, in turn, has an output coupled to decade counter 73 having an output coupled to decade counter 74 having an output coupled to decade counter 76 which has an output coupled to decade counter 77. Decade counters 71, 72, 73, and 74, each has outputs coupled to printer control 78 and display memory 79. Printer control 78 has inputs from decade counters 76 and 77, terminal 54 and paper advance 81 and an output to terminal 56. Printer control 78 is interconnected with printer 82. Display memory 79 has outputs coupled to display drivers 83 which, in turn, have outputs coupled to Nixie display 84. Decade counter 72 has an output coupled to a divide-by-two block 86 which, in turn, is coupled to binary tax counter 87. Binary tax counter 87 has outputs coupled to tax shift register 88 which, in turn, has an output coupled through ORgate 69 to adder 64. Adder 64 has an output coupled to terminal 39.

OPERATION

INPUTS

The price of each item is programmed into the machine by means of price change switches 17 on the program panel. The maximum price for each item in the embodiment shown is $9.99. The sales tax rate is programmed by tax switches 66. The machine will accept tax rates from 0.0 to 9.5 percent in increments of 0.5 percent. The minimum taxable purchase is the price under which no tax is charged. This number is programmed in by minimum taxable purchase switch 22. Keyboard inputs consist of 30 item keys 32, 10 quantity keys 26, and a total key 11.

OUTPUTS

A four-digit display panel 84, using Nixie readout tubes, displays the total purchase price up to a maximum of $99.99. The total for every transaction is displayed in the window. A receipt is produced for each transaction by printer 82. The receipt contains the item number and price for each item ordered, the tax on the purchase, and the grand total. Upon command from inventory button 13, the printer 82 will print an inventory tape consisting of (1) the total cash and (2) an item-by-item list of the total number of each item sold. The printer will also, on command, print the total cash only. When the total cash and inventory is cleared from the machine, the printer will prepare an inventory tape, thus providing a copy of the latest totals before they are erased from memory.

MEMORY

Figure 3:
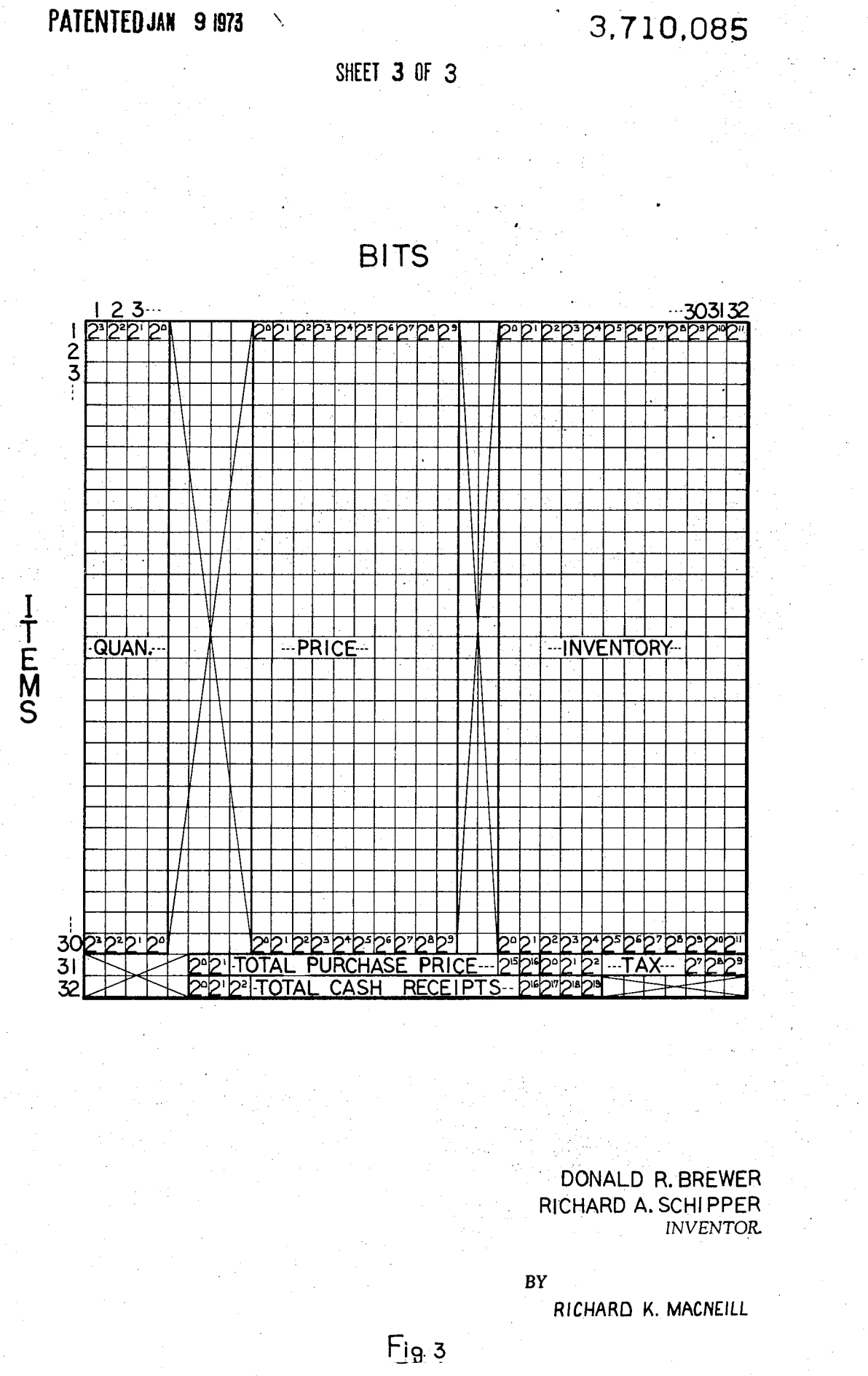

Referring to FIG. 3, a 32 × 32 magnetic memory core matrix is used for price, inventory and cash total memory. The memory is also used for temporary storage of quantity, tax and total for individual transactions. The memory is arranged into 32 words of 32 bits each. The words are referred to as items. The first thirty items in memory correspond to the 30 item keys 32 (FIG. 1) on the keyboard. Item 31 is temporary storage for tax and total and item 32 stores the total cash. The price for each individual item on the keyboard is stored in the corresponding item in memory. Price is stored in bits 9 through 18 and is binary with the least significant bit in bit 9 position. When a transaction is entered into the machine, the quantity of each item ordered is written in the appropriate item in memory in bit positions 1 through 4 and is binary with the most significant bit in bit 1 position. The inventory or total number of each item sold is stored in bit positions 21 through 32 in each item. The inventory is in binary with the least significant bit position 21. During a transaction, the tax and total must be stored temporarily and printed at the end of the tape. Item 31 accommodates this data. Total is stored in bits 6 through 22 in binary with the least significant bit in position 6. The tax is stored in bits 23 through 32 in binary with the least significant bit in position 23. As each transaction is completed, the total for that transaction is added to the total receipts for the day in item 32. The total cash is stored in bits 6 through 25 in binary with the least significant bit in position 6.

ARITHMETIC

All necessary addition is accomplished serially by adder 64 which is preferably a full adder with carry delay. The necessary addition is: (1) add quantity to inventory; (2) add tax to total; (3) add grand total to daily total. The only subtraction necessary is to subtract the minimum taxable purchase from the total to determine if tax is to be added. This is accomplished serially in subtractor 24 with borrow delay. The presence of a borrow at the end of the subtraction indicates that no tax should be charged on the transaction. Multiplication is accomplished by shifting the multiplicand serially in shift register 61 and accumulating in parallel in accumulator 67. The multiplier and multiplicand are both shifted through shift register 61. The multiplier is ahead of the multiplicand with the most significant bit first. The multiplicand is shifted least significant bit first. The shift register 61 is connected parallely to accumulator 67. As multiplier bits emerge from shift register 61, they activate accumulator 67 and add the multiplicand to accumulator 67. When the multiplier has been shifted all the way out of shift register 61, the product is contained in accumulator 67. The multiplier is used to multiply quantity times price and tax rate times total. The tax rate is a binary number representing the tax rate times 200. The scale factor of 200 is accomplished in the tax rate switch wiring. The only division necessary in the machine is to divide the tax figure by 200 to offset the scale factor of 200 in the tax rate. The division is done by counting down through two decade counters, 71 and 27, and one flip-flop 86. The result is a divide by 10 × 10 × 2. All data storage and computations are in binary. Input and output data are in binary coded decimal.

PROGRAM DATA INPUTS

The tax rate is coded as a five bit binary number in tax switch 66 with the least significant bit having a weight of ½ of 1 percent. Thus, 0.005 is equivalent to a binary 1, or 200 times the tax rate. The tax rate is stored in the switch and is sampled when tax is computed. Three binary coded decimal digit switches shown as block 21 are used to enter prices into the machine. This binary coded decimal number is converted to binary in BCD to binary converter 19. To enter a price into the machine, an item is selected on the keyboard at item keys 32 which address the core through item address 35 and the price change 17 is pressed. A BCD output is converted to binary in BCD to binary converter 19 and written into the addressed item in the core. The minimum taxable purchase input 22 is preferably a two-decade BCD switch. When the total for a transaction has been computed in accumulator 67, this switch is sampled and the BCD number is converted to binary and compared to the total. The comparison is done in subtractor 24 by subtracting the minimum taxable from the accumulator total. If a borrow exists, it is utilized as a tax inhibit to arithmetic control 41 and no tax is computed.

OPERATOR INPUTS

Keyboard inputs consist of thirty item keys 32, ten quantity keys 26, one total key 11, one cancel key 12, and one daily total key 16. Each key is connected to a latch circuit which remembers an entry and all keys have interlock circuits to guard against erroneous inputs. These circuits are located in keyboard control and interlocks 33. When an item key 32 is depressed, the circuit will latch and all other item keys will be interlocked. The same applies to the quantity keys 26.

Once one item and one quantity are latched, the quantity is written into memory core 34 in the item selected by item key 32. Item and quantity interlocks are then both turned off and the keys are unlatched. The keyboard is now ready for another entry. Quantities may be entered for as many items are desired up to the maximum number of items on the keyboard. All entries are written into memory core 34 and retained until total key 11 is pressed and the order is computed.

COMPUTATION OF A TRANSACTION

When the total key 11 is pressed, a total flip-flop (not shown) is set and all keyboard inputs are interlocked. At the same time, the first total cycle flip-flop (not shown) is set and the bit timer 28 and item timer 31 begin to run. During the first total cycle, the entire transaction is computed and the total is displayed at Nixie display 84. Each item is read from memory core 34 sequentially. The bit timer 28 is cycled twice for each item. During the first item cycle, the item is read out to the arithmetic control 41 for computation and during the second item cycle, the updated inventory is written back into memory from adder 64 through core timing 23. As the item is being read in the first item cycle, the data is shifted serially to shift register 61. During the first four bits of the item, quantity is examined. If quantity is zero, no more data is read from that item. The bit timer 28 will continue to count and at bit 0 time, the second item cycle will start. Since quantity was zero, the item will still not be read, but bit timer 28 will continue to count. At the end of the second item cycle, the item timer 31 will advance one count. The bit timer 28 will now cycle twice for the next item and advance the item timer 31 one more item. When an item is read and a quantity is detected during the first four bits of the first item cycle, this item must be computed. The entire item is read: quantity, price and inventory. The data is shifted into shift register 61. At this time, the quantity is sampled and stored in quantity register 63 for use later on. The machine then starts the second item cycle. Shift register 61 continues to shift and the first data out of the shift register is quantity with the most significant bit first. If a quantity bit is a one, the price is parallely loaded and added to accumulator 67. After all the quantity bits are out of shift register 61, the product of quantity times price is in accumulator 67. Shift register 61 continues shifting and at bit 21 time the first bit of inventory is at its output. At this time, quantity from quantity shift register 63 is added in adder 64 to inventory from accumulator 67 and the sum is written back into memory as updated inventory. At the end of the second item cycle, the item timer 31 advances and the next item is read. As each item is computed, its product is added to the accumulator 67. When all items have been read, the accumulator 67 contains the total purchase price less tax. The item timer 31 is advanced to item 31 and the tax cycle starts. During the tax cycle, item timer 31 does not advance, but bit timer 28 continues to run to provide timing for the computations. The sub-total in accumulator 67 is shifted out and into shift register 61 through arithmetic control 41. When the sub-total is in the proper position in shift register 61, the tax switch 66 is sampled and the tax rate × 200 is loaded into the first five bit locations of shift register 61. As shift register 61 continues to shift, the sub-total is multiplied by the tax rate and the product is held in accumulator 67. This product represents the tax × 200. The output of shift register 61 is now connected to its input through arithmetic control 41 and the sub-total is re-circulated in shift register 61 as a means of temporary storage. The tax × 200 is loaded from accumulator 67 into countdown counter 68. As the counter is counted down, a clock is simultaneously counted up through a divide by 200 by decade counters 71 and 72 and divide counter 86 to binary tax counter 87. When the countdown is completed, the clocks stop and tax count 87 contains the tax rounded off to the nearest cent. The tax is now loaded into tax shift register 88. When the sub-total is in the proper position in shift register 61, tax shift register 88 is clocked and the sub-total and the tax are added serially in adder 64 and written into item 31 in memory core 34. At the same time, the tax is re-circulated in the tax register 88 and the grand total is re-circulated in shift register 61. After the grand total has been written into memory core 34, the tax register 88 is again shifted and the tax is written into item 31 in memory core 34. The grand total in shift register 61 is loaded into accumulator 67 and the countdown counter 68. The countdown counter 68 begins counting down and simultaneously decade counters 71, 72, 73, 74, 76 and 77 are counted up. When the countdown is completed, the grand total in the decade counters is displayed in Nixie display 84 and the cash drawer (not shown) opens. Now the item timer 31 is advanced to item 32 and the daily total is read out of memory and shifted into shift register 61. When the daily total is in position, the grand total in accumulator 67 is shifted out and added to the daily total serially in adder 64 and the updated daily total is written back into item 32 in memory core 34. At this point, the first total cycle is reset and the second total cycle is set. All necessary computations have been completed at this time. During the second total cycle, the receipt is printed in printer 82.

The second total cycle is very similar to the first. Each item is read sequentially, and there is a first cycle and a second item cycle for each item as before. When a quantity is detected in an item, the item is read out to shift register 61. Price is multiplied by quantity as before and the total for that item is held in accumulator 67. The bit timer 28 stops and a start print command from sequence control 18 turns on printer control 78 and printer 82. The accumulator 67 is loaded into the countdown counter 68 and converted to BCD in the decade up counters 71, 72, 73, 74, 76, 77. The BCD item total is printed on a tape along with the item number in printer 82. A print complete signal is now applied to sequence control 18 which advances item timer 31 and bit timer 28 starts again. The accumulator 67 is cleared after each item rather than accumulating sub-totals as in the first total cycle. When the item timer 31 reaches item 31, the tax and total are read out to shift register 61. Tax is loaded into accumulator 67 and then into countdown counter 68. Total is loaded into accumulator 67 for temporary storage. The tax is counted down in countdown counter 68, converted to BCD in binary to BCD conversion control 42, and printed in printer 82. Now the total is likewise loaded from accumulator 67 to countdown counter 68, converted to BCD and printed. The item timer 31 then advances to item zero and the second total cycle is re-set.

A cancel cycle turns on and the item timer begins stepping through all items. During cancel cycle, all quantities are erased from memory and the machine is restored to a ready status.

When the inventory button 13 is pushed, the memory core 34 is read item by item and inventory is printed for each item. The inventory for each item is shifted to shift register 61 and loaded into the countdown counter 68 for conversion. This process is the same as printing a receipt during the second total cycle. Pushing clear button 14 produces the same results except that all inventories are erased from memory.

The digital timing and control circuitry present in core timing 23, sequence control 18, arithmetic control 41 and binary to BCD conversion control 42 have not been detailed since the control and timing circuitry therein is deemed to be completely state of the art and well within the designed capabilities of one skilled in the computer arts. Further, the detail contained in these blocks would only serve to mask and obliterate the gist of the current invention as defined by the appended claims.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A pre-set electronic cash register comprising:
    a memory matrix, said memory matrix having a plurality of prices programmed therein, each price representing a separate item;
    a quantity read-in means coupled to said memory matrix for reading in quantities of said items;
    readout means coupled to said memory matrix for serially reading out each price and quantity from said memory matrix;
    a shift register coupled to said readout means for storing said quantity and price readouts serially;
    an accumulator coupled in parallel to said shift register for accumulating the product of the quantity and price in said shift register;
    a readout means; and
    coupling means coupling said readout means to an output of said accumulator.

2. The pre-set electronic cash register of claim 1 and further including:
    tax computing means coupled to said shift register for computing the sales tax on each transaction.

3. The pre-set electronic cash register of claim 1 and further including:
    tax computing means coupled to said shift register for computing the sales tax on each transaction; and
    inhibiting means coupled to said tax computing means for inhibiting any tax computation on purchases below the minimum taxable purchase.

4. The pre-set electronic cash register of claim 3 and further including:
    programing means for programing the minimum taxable purchase into said inhibit means.

5. The pre-set electronic cash register of claim 1 and further including:
    price change means for programing a price change of any item into said memory matrix.

6. The pre-set electronic cash register of claim 1 wherein:
    said memory matrix includes a plurality of item rows for storing the price of each item, the current inventory and the quantity of each transaction serially; and further including
    an additional row for storing total purchase price and tax; and
    a further additional row for storing cash receipts.

* * * * *